United States Patent
Huang

[11] Patent Number: 6,047,937
[45] Date of Patent: Apr. 11, 2000

[54] VEHICLE-USE FOLDABLE BEVERAGE HOLDER

[76] Inventor: Pei-Hsiu Huang, 4/Fl. No. 12-1, Alley 15, Lane 214, Chung Hsin Rd., Sec. 4, San Chung, Taipei, Taiwan

[21] Appl. No.: 09/134,660

[22] Filed: Aug. 14, 1998

[51] Int. Cl.[7] ............................................. A47K 1/08
[52] U.S. Cl. .................................. 248/311.2; 248/312.1
[58] Field of Search ........................... 248/311.2, 312.1, 248/465, 188.91, 292.13

[56] References Cited

U.S. PATENT DOCUMENTS

| | | | |
|---|---|---|---|
| 1,074,430 | 9/1913 | Hill | 248/448 |
| 2,828,098 | 3/1958 | Lehmann | 248/292.13 |
| 4,828,211 | 5/1989 | McConnell et al. | 248/311.2 |
| 5,014,956 | 5/1991 | Kayali | 248/311.2 |
| 5,318,266 | 6/1994 | Liu | 248/311.2 |
| 5,342,009 | 8/1994 | Lehner | 248/311.2 |
| 5,601,268 | 2/1997 | Dunchock | 248/311.2 |
| 5,628,486 | 5/1997 | Rossman et al. | 248/311.2 |

*Primary Examiner*—Ramon O. Ramirez
*Assistant Examiner*—David Heisey
*Attorney, Agent, or Firm*—Jacobson, Price, Holman & Stern, PLLC

[57] ABSTRACT

A vehicle-use foldable beverage holder that includes a mounting plate, a base plate, a left clip arm, a right clip arm, and a clip arm rod. The mounting plate has a hole or an elongated hole in each of the two lateral walls of the mounting plate body, and there is a rearward detent at the lower end of the elongated hole. The base plate has a hole in each of the two containment edges of the base plate body. A support connecting rod that is a movable linkage structure including an upper connecting rod and a lower connecting rod, or which may consist of a single strip. The top end of the upper connecting rod of the support connecting rod is actively linked to a hole in the lateral wall of the mounting plate body, and the lower end of the lower connecting rod is linked to a hole in the containment edge of the base plate body. Therefore, the support connecting rod is maintained in a stationary configuration of approximately 130 degrees in between the mounting plate and the base plate. The upper and lower ends of the strip are directly linked to the elongated hole in the lateral wall of the mounting plate and hole in the containment edge of the base plate, and are utilized to support the vehicle-use foldable beverage holder in a fixed L-shaped configuration. A decorative cover plate, is inserted into the fastener holes on the mounting plate body at the rear of the mounting plate.

4 Claims, 5 Drawing Sheets

VEHICLE-USE FOLDABLE BEVERAGE HOLDER

BACKGROUND OF THE INVENTION

The invention herein relates to an improvement of the "Vehicle-use Foldable Beverage Holder" invention registered under U.S. Pat. No. 5,072,909, specifically referring to a kind of improved vehicle-use foldable beverage holder offering installation and utilization enhancements.

The invention herein was first improved by the lather of the applicant as the "Vehicle-use Foldable Beverage Holder" and, as indicated FIG. 8 and FIG. 9, was mainly comprised of a mounting plate (1), a base plate (2), a left clip arm (3*a*), a right clip arm (3*b*), and clip arm rod (5). The aforesaid adjustable vehicle-use foldable beverage holder offered more practicality than conventional beverage holders. However, since the installation and mounting method remained similar to that of conventional beverage holders in that the mounting plate (1) was directly fastened by means of screws or adhesives to a vertical interior surface or inside the door of a vehicle and the can or cup of beverage was held onto the base plate (2) by the two clip arms (3*a*) and (3*b*), which prevented the occurrence of slanting. Due to the introduction of numerous vehicle models, especially luxury sedans having interiors characterized by a flowing line design, locating a vertical area for fastening or adhering the mounting plate (1) became increasingly difficult and required a modification so that the underside of the base plate (2) could be directly adhered near the driver's seat or other level installation surfaces. Furthermore, since the "Vehicle-use Foldable Beverage Holder" developed by the father of the applicant and of the conventional products were not equipped with a support connecting rod, the mounting plate (1) frequently tended to automatically fall over and cover the base plate (2) (as depicted in FIG. 7), such that when a beverage can or beverage cup was placed onto the base plate (2), slanting would occur at the slightest contact. While most beverage spills in vehicles dirty the interior, such messes can be cleaned up. However, seated passengers are exposed to injury by scalding if a hot beverage tips over in the vehicle, a very unsafe situation. Furthermore, there are numerous vertically and horizontally intersecting reinforcement ribs (14) on the rear surface of the mounting plate (1) body (10) such that when the aforesaid vehicle-use foldable beverage holder is not being utilized, the two clip arms (3*a*) and (3*b*) are folded down against the front of the mounting plate (1) and then the mounting plate (1) is folded against the base plate (2) (as depicted in FIG. 9) to conserve space. However, the numerous reinforcement ribs (14) on the exterior of existent vehicle-use beverage holders is totally unattractive and, furthermore, does not match the interior flowing lines of vehicles, which a frequent consumer complaint.

The applicant of the invention herein has accumulated many years of experience while assisting his father in the manufacturing and marketing of the aforementioned vehicle-use beverage holder and, furthermore, has observed that both the aforesaid beverage holder as well as conventional units are affected by the aforementioned shortcomings and, therefore, conducted research and testing to develop the improved vehicle-use beverage holder of the invention herein.

SUMMARY OF THE INVENTION

The primary objective of the invention herein is to provide a kind of vehicle-use folding beverage holder in which there is a minimum of one support connecting rod in between the mounting plate and the base plate to ensure that the two clip arms on the mounting plate do not slant forward when a can or cup of beverage is being held onto the base plate.

Another objective of the invention herein is to provide a kind of vehicle-use folding beverage holder in which a lock-type or an insert-type decorative cover plate can be installed to the rear surface of the mounting plate to enhance the appearance of the vehicle-use folding beverage holder when not in utilization and the aforesaid mounting plate is covering the base plate.

PARTS OF THE DRAWINGS

1-Mounting plate.
2-Base plate.
3*a*-Left clip arm.
3*b*-Right clip arm.
4-Clip arm rod.
5*a*-Lock-type decorative cover plate.
5*b*-Insert-type decorative cover plate.
6, 6' Support connecting rod.
7, 7' Split rivet.
8-Spring
10-Mounting plate body.
11-Lateral wall.
12-Upper bracket.
13-Lower bracket.
14-Reinforcing rib.
15-Post.
16-Hole.
17-Fastener hole.
18-Protruding strip.
19-Elongated hole.
20-Base plate body.
21-Base plate containment edge.
22-Hole.
22' Hole.
50*a*-Lock-type decorative cover plate body.
50*b*-Insert-type decorative cover plate body.
51-Containment edge.
52-Split post.
53-L-shaped lip.
54-Beveled tab
60-Strip 61-Upper connecting rod.
62-Lower connecting rod.
191-Detent.
601, 602-Hole.
603, 604-Arrowhead-shaped split post.
610-Upper connecting rod strip.
611-Arrowhead-shaped split post.
612-Semicircular post.
613-Through-hole.
614-Positioning tab.
620-Lower connecting rod strip.
621-Arrowhead-shaped split post.
622-Arrowhead-shaped split post.
623-Positioning hole.

DETAILED DESCRIPTION OF THE INVENTION

Figure 1:
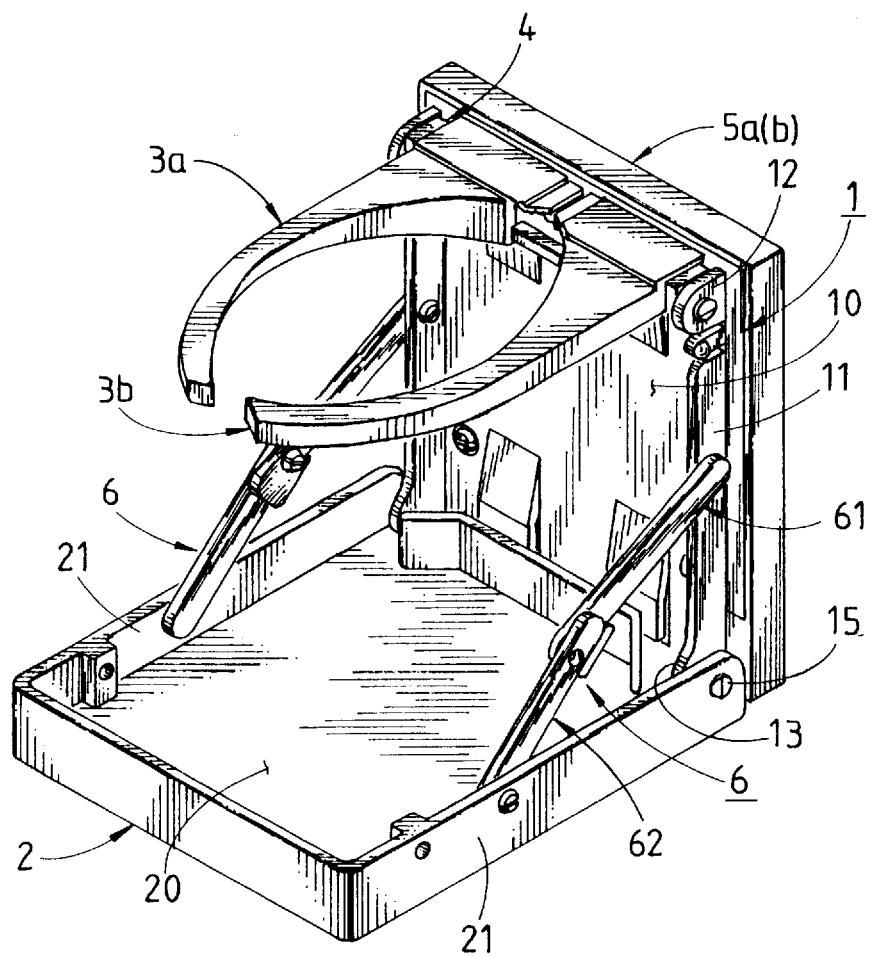
FIG. 1 is an isometric drawing of the invention herein during utilization.
Figure 2:
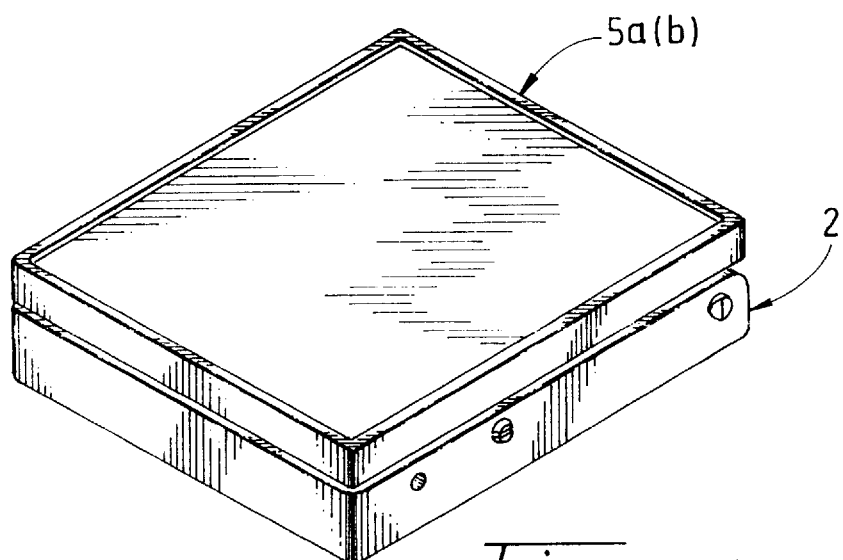
FIG. 2 is an isometric drawing of the invention herein after utilization or while not being utilized.
Figure 3:
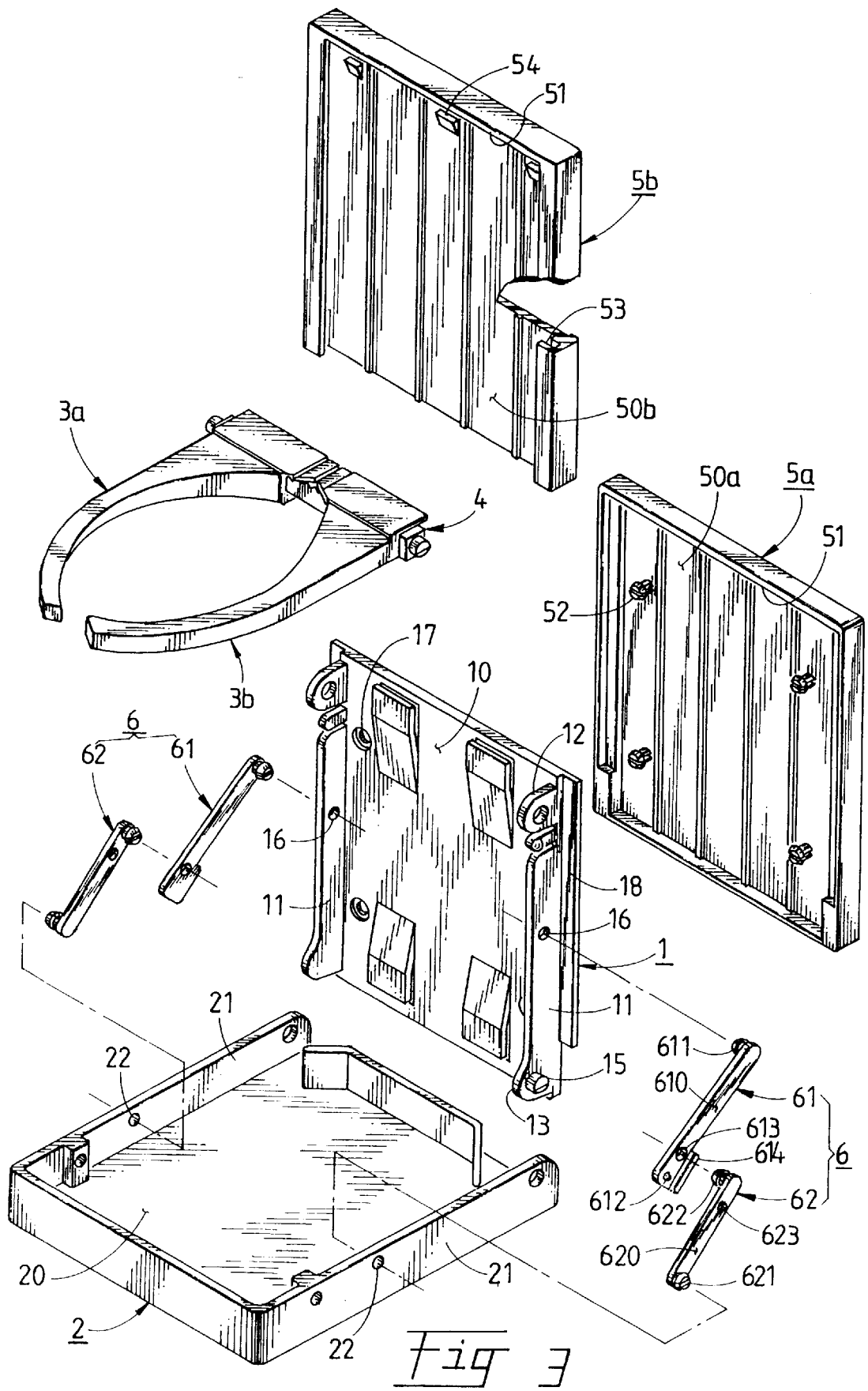
FIG. 3 is an isometric exploded drawing of the invention herein.

Referring to FIG. 1, FIG. 2 and FIG. 3, the improved vehicle-use foldable beverage holder of the invention herein is mainly comprised of a mounting plate (1), a base plate (2), a left clip arm (3a), a right clip arm (3b), and a clip arm rod (4). All of the aforesaid components are Constructed of a plastic material and are formed in single molding process and, furthermore, after the left clip arm (3a) and right clip arm (3b) are first directly sleeved onto the clip arm rod (4) (as indicated in FIG. 3) manually and then fitted onto the upper bracket (12) at the two sides of the mounting plate (1); finally, the two rear sides of the base plate (2) are fitted onto the posts (15) at the two sides of the lower bracket (13), which completes the assembly of the improved vehicle-use foldable beverage holder of the invention herein. However, when the mounting plate (1) of the improved vehicle-use foldable beverage holder of the invention herein is being molded, a hole (16) is formed in each of the two lateral walls (11) of the mounting plate body (10); furthermore, a hole (22) is formed in each of the two lateral containment edges (21) of the base plate body (20), thereby enabling the installation of the support connecting rods (6) in between the left and right sides of the mounting plate (1) and the base plate (2), which are utilized to supportively maintain the aforesaid mounting plate (1) and base plate (2) in a fixed L-shaped configuration (as viewed from a left lateral perspective), such that the aforesaid mounting plate (1) is prevented from slanting towards or slanting and covering the aforesaid base plate (2) during the utilization of the invention herein. Each of the aforesaid support connecting rods (6) is structurally an active linkage comprised of an upper connecting rod (61) and a lower connecting rod (62) which are molded from a plastic material; during the fabrication of the aforesaid upper connecting rod (61), a long connecting rod strip (610) is molded with an arrowhead-shaped split post (611) on the inner side of the upper end, which is capable of pivoting freely when inserted into the hole (16) through the lateral wall (11) of the mounting plate body (10); a semicircular post (612) and a through-hole (613) are molded on the outer side of the lower end of the aforesaid connecting rod strip (610) and, furthermore, a positioning tab (614) is molded on the edge below the through-hole (613) and the semicircular post (612); during the fabrication of the lower connecting rod (62), a long lower connecting rod strip (620) is molded with an arrowhead-shaped split post (621) molded at the outer side of the lower end, which is capable of pivoting freely when inserted into the hole (22) through the containment edge (21) of tile base plate body (20); furthermore, an arrowhead-shaped split post (622) is molded on the inner side of the upper end of the aforesaid lower connecting rod strip (620), which capable of pivoting freely when inserted into the through-hole (613) at the lower end of the aforesaid upper connecting rod (61) and thereby operate as a linkage mechanism; to enable the movable linkage of aforesaid upper connecting rod (61) and the aforesaid lower connecting rod (62) to remain in a stationary configuration that is approximately 130 degrees (as viewed a right lateral perspective), the point near the upper end of the aforesaid lower connecting rod strip (620) must be positioned across from the semicircular post (612) on the aforesaid connecting rod strip (610), and the additional molding of a positioning hole (623) enables such a configuration of the linked upper connecting rod (61) and lower connecting rod (62) because the semicircular post (612) on the aforesaid upper connecting rod (61) can be inserted into the positioning hole (623) of the lower connecting rod (62) and, furthermore, the edge at the upper end of the aforesaid lower connecting rod (62) rests against the positioning tab (614) at the lower end of the aforesaid upper connecting rod (61), thereby maintaining the aforesaid stationary configuration of approximately 130 degrees.

Since the improved vehicle-use foldable beverage holder of the invention herein has at minimum one support connecting rod (6) movable linkage (a movable linkage can also be installed on both the left and right sides) in between the mounting plate (1) and the base plate (2) at either the left or right side (according to the preference or convenience of the user) and the aforesaid support connecting rod (6) is capable of maintaining a stationary configuration of approximately 130 degrees, as described in the foregoing section, therefore, the mounting plate (1) and the base plate (2) can be supported in a fixed L-shaped configuration (as indicated in the left lateral view of the FIG. 1) during utilization; therefore, the bottom of the base plate (2) of the invention herein can be installed on a flat surface inside a vehicle by using an adhesive or other means of mounting and, when a beverage call or cup (not shown in the drawings) is held in between the left clip arm (3a) and the right clip arm (3b) on the base plate (2), the mounting plate (1) will not slide forward in the direction of the aforesaid beverage can or cup, such that a cup of hot beverage being held will not tip over and scald passengers. Following usage, the empty can or cup is removed from the left clip arm (3a) and the right clip arm (3b), while the left clip arm (3a) and the right clip arm (3b) are secured onto the mounting clip (1) and then, one finger is pushed against the movable linkage conjoining the upper connecting rod (61) and the lower connecting rod (62) of the one or two support connecting rod (6) and the rearward push causes the original configuration of approximately 130 degrees to fold into congruous reverse angle, following which another finger pushes the mounting plate (1) forward and flush against the aforesaid base plate (2), a procedure that results in a final state of appearance (as indicated in FIG. 2) similar to conventional vehicle-use folding beverage holders.

Figure 9:
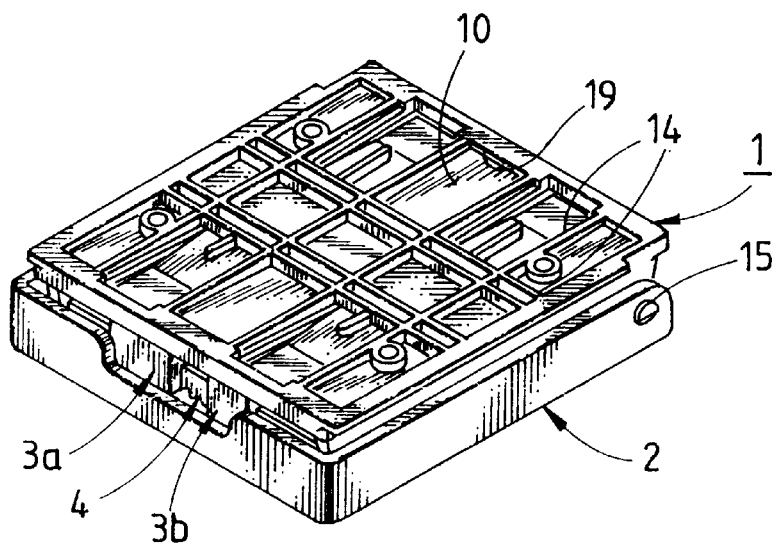
FIG. 9 is an isometric drawing of a conventional folding beverage holder after utilization or while not being utilized.

Referring to FIG. 2, although the post-utilization folding procedures and condition of the invention herein is similar to that of conventional devices, the invention herein has a lock-type decorative cover plate (5a) (as indicated in FIG. 1) or an insert-type decorative cover plate (5b) (as also indicated in FIG. 2) that is fastened to the rear surface of the mounting plate (1) and, therefore, the unattractive reinforcing rib (14) (shown in FIG. 9) on the rear surface of the aforesaid mounting plate (1) are completely covered by the aforesaid lock-type decorative cover plate (5a) or insert-type decorative cover plate (5b) and remains out of view; at the same time, the lock-type decorative cover plate body (50a) and the insert-type decorative cover plate body (50b) can be embellished with a walnut veneer or leather through adhesion or overlaying to further enhance the appearance. As indicated in FIG. 3, the aforesaid lock-type decorative cover plate (5a) consists of a cover plate body (50a) that is molded from plastic, with the dimensions matching that of the mounting plate (1) of the invention herein and essentially involves the molding of the containment edge (51) of the cover plate body (50a) as well as a minimum of two split posts (52) on the inner side of the aforesaid cover plate body (50a), which are inserted into the fastener holes (17) on the mounting plate body (10) at the rear of the mounting plate (1) and thereby permits a means of secure fastening to the rear surface of the aforesaid mounting plate (1) (as indicated in FIG. 1). As indicated in FIG. 3, the aforesaid insert-type decorative cover plate body (50b) consists of a cover plate body (50b) that is molded from plastic, with the dimensions matching that of the mounting plate (1) of the invention herein, and primarily involves the molding of a containment edge (51) at the upper end of the aforesaid cover plate body (50b) and two L-shaped lips (53) on two sides along the lower end and, furthermore, the molding of at least one beveled tab (54) adjacent to the containment edge (51) on the inner side of the aforesaid cover plate body (50b), which enables the L-shaped lips (53) at the upper extent of the aforesaid mounting plate (1) to fit over the protruding strips (18) on the two sides of the aforesaid mounting plate body (10) and thereby be insertion fastened to the rear surface of the aforesaid mounting plate (1) (as indicated in FIG. 1).

Figure 4:
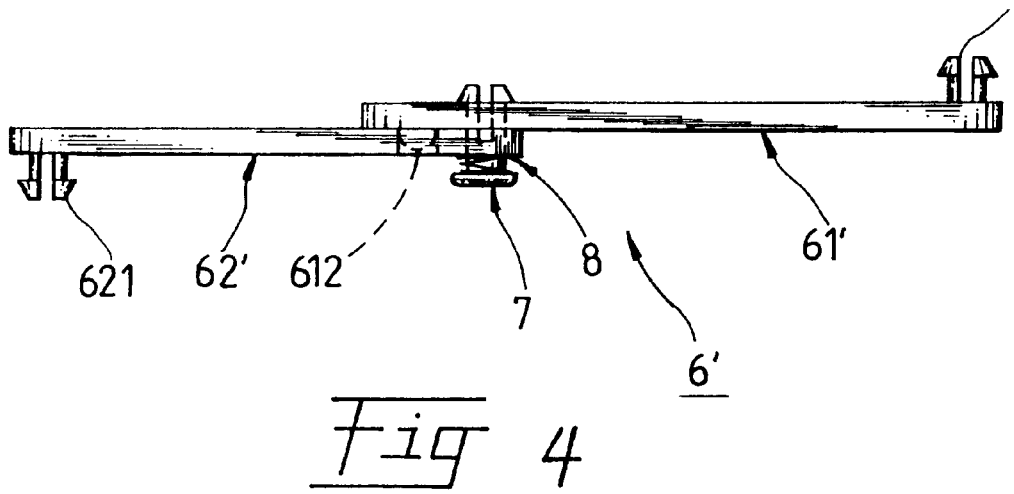
FIG. 4 is an orthographic drawing of another embodiment of the support connecting rod as viewed from above.
Figure 5:
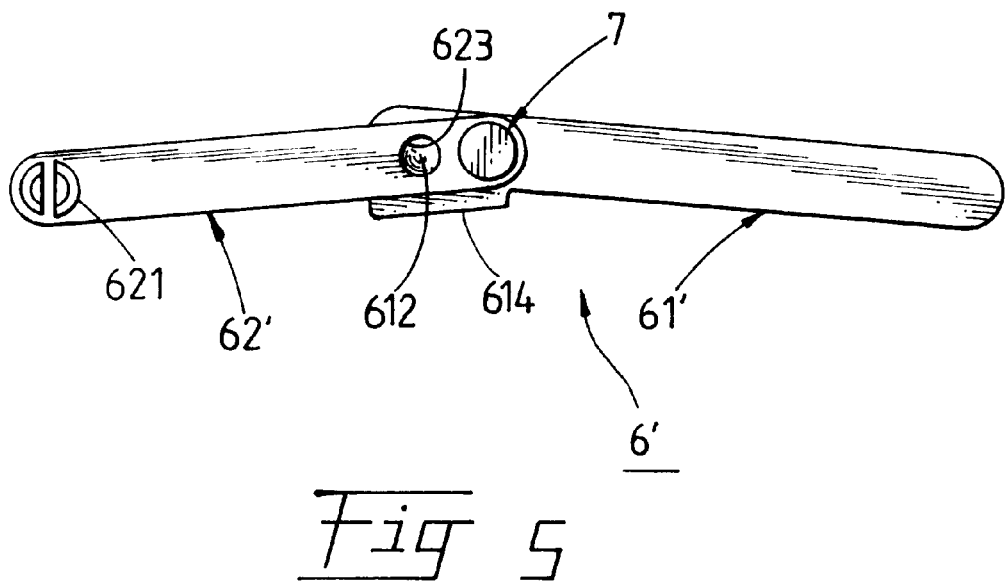
FIG. 5 is an orthographic drawing of another embodiment of the support connecting rod as view from the front.

Additional embodiments of the support connecting rod (6') of the invention are shown in FIG. 4 and FIG. 5. Although the aforesaid support connecting rod (6') is identical to previously described support connecting rod (6), and is structurally an active linkage comprised of an upper connecting rod (61') and a lower connecting rod (62'), the structure is not a direct linkage, and consists of a split rivet (7) that is first equipped with a spring (8) before installation into the linkage structure of the aforesaid upper connecting rod (61') and lower connecting rod (62'). The aforesaid upper connecting rod (61') is structurally identical to the upper connecting rod (61) of the support connecting rod (6) in the previously described embodiment and, furthermore, consists of a upper connecting rod strip (610) having an arrowhead-shaped split post (611) molded on the inner side of the upper end, a semicircular post (612) and a through-hole (613) molded on the outer side of the lower end and, furthermore, a positioning tab (614) molded on the edge below the through-hole (613) and the semicircular post (612); although the aforesaid lower connecting rod (62') has an arrowhead-shaped split post (621) molded at the outer side of the lower end of the lower connecting rod strip (620), in addition to the positioning hole (623) molded at the inner side of the upper end, a through-hole is molded at the uppermost end in instead of the originally molded arrowhead-shaped split post (622), with the split rivet (7) equipped with the spring (8) inserted to complete the linkage structure with the upper connecting rod (61'). In the linkage structure between the mounting plate (1) and the base plate (2) of invention herein, the support connecting rod (6') embodiment is functionally identical to the previously introduced embodiment Support connecting rod (6) and similarly, the arrowhead-shaped split post (611) at the upper end of the upper connecting rod (61') is inserted into the hole (16) in the lateral wall (11) of the mounting plate body (10) to form the linkage structure; and the arrowhead-shaped split post (621) at the lower end of the lower connecting rod (62') is inserted into the hole (22) in the containment edge (21) of the base plate body (20) to form the linkage structure; at the same time, while the support connecting rod (6') embodiment is identical to aforementioned support connecting rod (6) in relation to the utilization and mounting procedures of the mounting plate (1) and the base plate (2) of the invention herein, the tensility of the spring (8) facilitates the easier insertion and removal of the semicircular post (612) in the positioning hole (623).

Figure 6:
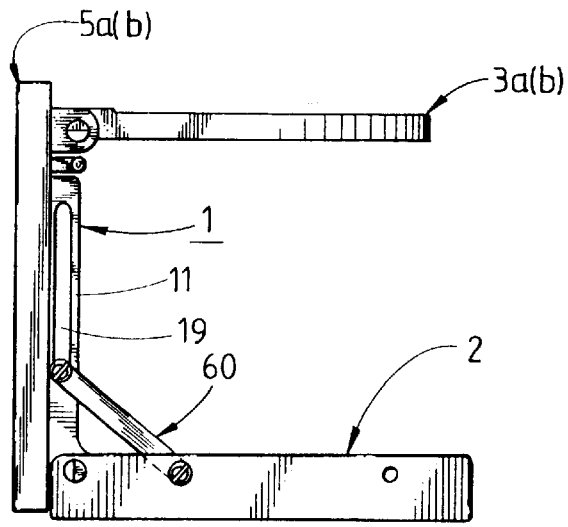
FIG. 6 is an orthographic drawing of the left side of another preferred embodiment of the invention herein.
Figure 7:
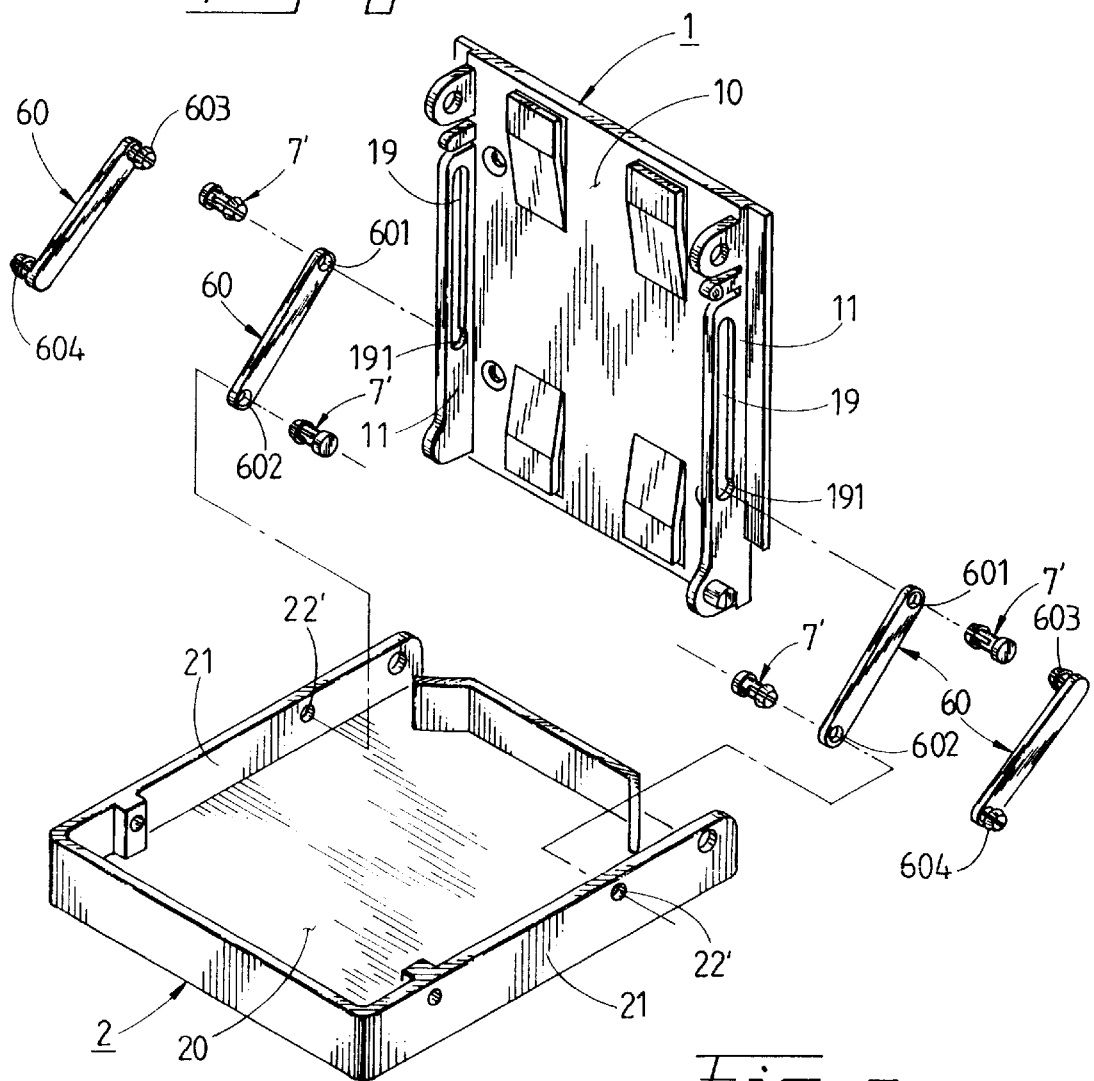
FIG. 7 is an exploded isometric drawing of another preferred embodiment of the invention herein.
Figure 8:
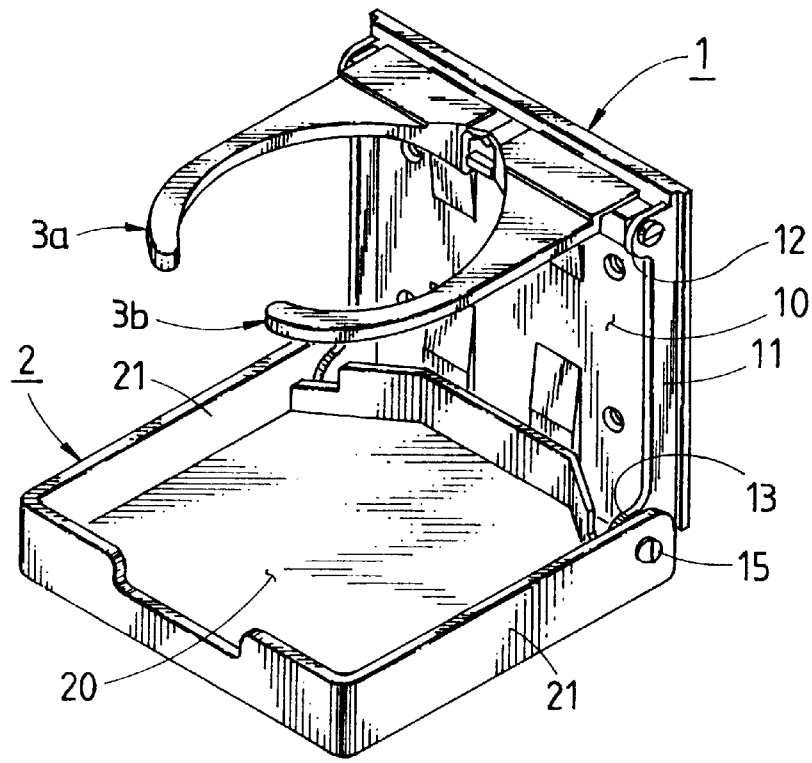
FIG. 8 is an isometric drawing of a conventional foldable beverage holder during utilization.

Furthermore, another preferred embodiment of the invention herein is shown in FIG. 6 and FIG. 7. The aforesaid preferred embodiment is mainly comprised of a strip (60) that functions as the support connecting rod and an vehicle-use foldable beverage holder linkage that consists of lateral walls (11) on the mounting plate (1) and containment edges (21) on the base plate (2) (as indicated in FIG. 8), and that supports the aforesaid mounting plate (1) and base plate (2) in a fixed L-shaped configuration. In the installation of the strip (60) to the vehicle-use foldable beverage holder, during the molding of the mounting plate (1), an elongated hole (19) must be formed in each of the two lateral walls (11) of the mounting plate body (10) and, furthermore, a detent (191) is formed at the lower end of the aforesaid elongated slot (19); during the molding of the base plate (2), a hole (22') must be molded in each of the two containment edges (21) of the base plate body (20), thereby enabling the link insertion of split rivet (7') in the holes (601) and (602) in each of the two ends of the strip (60) through the aforesaid elongated slot (19) and the aforesaid holes (22'). As the aforesaid strip (60) is being molded, the arrowhead-shaped split posts (603) and (604) are molded at the position of each of the two holes (601) and (602), with the aforesaid two arrowhead-shaped split posts (603) and (604) link inserted through each of the elongated holes (19) and the holes (22') A minimum of one laterally installed strip (60) must serve as the linkage structure in between the mounting plate (1) and the base plate (2) of the improved vehicle-use foldable beverage holder of the invention herein, and when the aforesaid mounting plate (1) is opened to an approximate vertical state, the split rivet (7') at the upper end of the aforesaid strip (60) or the arrowhead-shaped split post (603) is immovably positioned in the detent (191) at the lower end of the elongated slot (19) in the lateral wall (11) of the aforesaid mounting plate (1) such that the aforesaid strip (60) supports and maintains the aforesaid mounting plate (1) and the base plate (2) in a fixed L-shaped configuration (as indicated in FIG. 6), such that when the adhesive mounting on the underside of the base plate (2) attached to a suitable planer surface, the left clip arm (3a) and the right clip arm (3b) of the aforesaid mounting plate (1) holding the beverage cup or beverage can will not slant forward. Following utilization, one finger is utilized to push the aforesaid strip (60) forward and out of the detent (191) at the lower end of the aforesaid elongated slot (19) while another finger moves the aforesaid mounting plate (1) frontally to achieve the post-utilization folded state, as depicted in FIG. 2.

What is claimed is:

1. A vehicle-use foldable beverage holder comprising
   a mounting plate,
   a base plate,
   a left clip arm,
   a right clip arm,
   a clip arm rod,
   a mounting plate body of the mounting plate having a hole in each of two lateral walls,
   a base plate body of the base plate having a hole in each of two lateral containment edges,
   a support connecting rod having
      an upper connecting rod including a long strip with an arrowhead-shaped split post on an inner side of an upper end, a semicircular post and a through-hole in an outer side of a lower end, and a positioning tab on an edge located below the through-hole and the semicircular post, a lower connecting rod including a long strip with an arrowhead-shaped split post formed at an outer side of a lower end and at an inner side of an upper end, respectively, and a positioning hole proximal to the upper end of the long strip, the arrowhead-shaped split post at the upper end of the lower connecting rod being inserted into the through-hole in the lower end of the upper connecting rod to form a movable linkage structure of the support connecting rod, and the arrowhead-shaped split post at the upper end of the upper connecting rod being inserted into the hole in the lateral wall of the mounting plate body, thereby forming the movable linkage structure, the arrowhead-shaped split post at the lower end of the lower connecting rod being inserted into the hole in the containment edge of the base plate body, enabling the movable linkage structure of the support connecting rod to be maintained in a stationary configuration of approximately 130 degrees in between the mounting plate and the base plate and utilized to supportively maintain the mounting plate and base plate in a fixed L-shaped configuration, and a decorative cover plate including one of (a) a cover plate body having containment edges and a minimum of two split posts on an inner side of the cover plate body which are inserted into fastener holes on the mounting plate body at a rear of the mounting plate, and (b) a containment edge at an upper end and open access lower end, with L-shaped lips along two sides of the plate body and the placement of at least one beveled tab adjacent to the containment edge on an inner side of a cover plate body, which enables the L-shaped lips at an upper extent of the mounting plate to fit over the protruding strips on the two sides of the mounting plate body and thereby be insertion fastened to the rear surface of the mounting plate.

2. The vehicle-use foldable beverage holder as claimed in claims 1, wherein the support connecting rod is comprised of the lower connecting rod having the through-hole at the upper end that enables the placement of a spring through which a split rivet is inserted to form the movable linkage structure with the upper connecting rod.

3. The vehicle-use foldable beverage holder as claimed in claim 1, wherein the mounting plate has an elongated hole in each of the lateral walls of the mounting plate body and a rearward detent is formed at the lower end of the elongated slot, the base plate having a hole in each of the two containment edges of the base plate body, the strip having a hole in each of the two ends that enables the link insertion of a split rivet through the elongated holes in the lateral walls of the mounting plate and the holes in the containment edges of the base plate, which are utilized to supportively maintain the mounting plate and base plate in a fixed L-shaped configuration.

4. A vehicle-use foldable beverage holder as claimed in claim 3, wherein the strip has an arrowhead-shaped split post at each of the two ends that are respectively inserted into the elongated holes in the lateral walls of the mounting plate as well as the holes in the containment edges of the base plate, which are utilized to supportively maintain the mounting plate and base plate in a fixed L-shaped configuration.

\* \* \* \* \*